US00RE41285E

(19) United States
(12) Reissued Patent
Kingston

(10) Patent Number: US RE41,285 E
(45) Date of Reissued Patent: Apr. 27, 2010

(54) PLANETARY TRANSMISSION APPARATUS INCLUDING VEHICLE-WHEEL HUB

(75) Inventor: Tim Kingston, Eskilstuna (SE)

(73) Assignee: Volvo Construction Equipment AB, Eskilstuna (SE)

(21) Appl. No.: 10/197,533

(22) PCT Filed: May 12, 1998

(86) PCT No.: PCT/SE98/00865

§ 371 (c)(1),
(2), (4) Date: Mar. 18, 1999

(87) PCT Pub. No.: WO99/03699

PCT Pub. Date: Jan. 28, 1999

Related U.S. Patent Documents

Reissue of:
(64) Patent No.: 6,090,006
Issued: Jul. 18, 2000
Appl. No.: 09/269,030
Filed: Mar. 18, 1999

(30) Foreign Application Priority Data

Jul. 18, 1997 (SE) ..... 9702749-4

(51) Int. Cl.
*B60K 17/04* (2006.01)
*F16H 57/10* (2006.01)
*G60T 1/06* (2006.01)

(52) U.S. Cl. ..... 475/323; 108/372; 192/221.1; 74/391; 188/71.5; 188/264 AA

(58) Field of Classification Search ..... 475/323, 475/221, 322, 225; 74/391; 180/370, 369, 180/372; 188/18 A, 218 XL, 71.5, 264 AA; 192/221.1

See application file for complete search history.

(56) References Cited

U.S. PATENT DOCUMENTS

| | | | | | |
|---|---|---|---|---|---|
| 2,776,583 | A | | 1/1957 | Williams | |
| 2,920,722 | A | | 1/1960 | Schjolin et al. | 188/72 |
| 2,998,735 | A | * | 9/1961 | Elfes | 475/346 |
| 3,092,370 | A | * | 6/1963 | Kennedy | 254/297 |
| 3,115,204 | A | | 12/1963 | Dence | |
| 3,754,625 | A | | 8/1973 | Voth et al. | 192/4 A |

(Continued)

FOREIGN PATENT DOCUMENTS

| | | | | |
|---|---|---|---|---|
| AU | A-22840/88 | | 9/1988 | |
| CA | 961671 | * | 1/1975 | 475/323 |

(Continued)

OTHER PUBLICATIONS

Volvo, Planetary Gear, drawings, 1 sheet.
John Deere drawings, 3 sheets.

* cited by examiner

*Primary Examiner*—Roger Pang
(74) *Attorney, Agent, or Firm*—Novak Druce + Quigg LLP

(57) ABSTRACT

A planetary transmission for a vehicle, comprising a planet carrier, on which at least one planet wheel is mounted, a hub arranged for a vehicle wheel and connected to the planet carrier, and a static housing which is connected to the vehicle and in which the hub is mounted. A friction brake is arranged at an outer periphery of the planet carrier and is intended to brake the rotation of the planet carrier in relation to the static housing. The hub and the planet carrier are interconnected by a splined connection. According to an embodiment, an outer gear ring is arranged so as to interact with the at least one planet wheel, which outer gear ring is connected to the static housing by a second splined connection.

44 Claims, 2 Drawing Sheets

U.S. PATENT DOCUMENTS

| | | | | | |
|---|---|---|---|---|---|
| 3,957,146 | A | * | 5/1976 | Le Blanc | 192/111 A |
| 4,173,269 | A | | 11/1979 | Craig | 188/71.5 |
| 4,181,042 | A | | 1/1980 | Rau et al. | 74/750 R |
| 4,424,874 | A | | 1/1984 | Koike et al. | 180/70 R |
| 4,611,506 | A | | 9/1986 | Groothius | |
| 4,646,880 | A | | 3/1987 | Logan | |
| 4,649,772 | A | | 3/1987 | Daniel et al. | |
| 4,655,326 | A | | 4/1987 | Osenbaugh | 188/18 A |
| 4,662,246 | A | | 5/1987 | Cheek et al. | |
| 4,961,485 | A | * | 10/1990 | Huff et al. | 192/221.1 |
| 5,014,800 | A | | 5/1991 | Kawamoto et al. | |
| 5,024,636 | A | | 6/1991 | Phebus et al. | 475/141 |
| 5,064,530 | A | | 11/1991 | Duff et al. | 210/94 |
| 5,088,967 | A | | 2/1992 | Opitz et al. | 475/107 |
| 5,147,255 | A | * | 9/1992 | Strehler et al. | 475/311 |
| 5,228,543 | A | * | 7/1993 | Heidenreich | 188/72.4 |
| 5,391,122 | A | | 2/1995 | Forster | 475/72 |
| 5,391,123 | A | | 2/1995 | Forster | 475/83 |
| 5,397,281 | A | | 3/1995 | Forster | 475/83 |
| 5,397,282 | A | * | 3/1995 | Weidman | 475/205 |
| 5,435,793 | A | | 7/1995 | Varela et al. | 475/311 |
| 5,476,272 | A | * | 12/1995 | Hixson, II | 277/317 |
| 5,509,864 | A | | 4/1996 | Hauser | 475/316 |
| 5,522,259 | A | | 6/1996 | Schmidt et al. | 73/121 |
| 5,645,148 | A | | 7/1997 | Saurin et al. | 192/4 A |
| 5,746,675 | A | | 5/1998 | Sugiyama | 475/278 |
| 5,842,947 | A | * | 12/1998 | Weilant | 475/323 |
| 6,115,662 | A | | 9/2000 | Sugano et al. | 701/76 |

FOREIGN PATENT DOCUMENTS

| | | | | | |
|---|---|---|---|---|---|
| DE | 2328929 | | | 12/1973 | |
| DE | 2357451 | C2 | | 9/1981 | |
| DE | 3222261 | A1 | | 12/1983 | |
| DE | 2907138 | C2 | | 8/1987 | |
| DE | 3836457 | A1 | | 5/1990 | |
| DE | 39000075 | A | | 7/1990 | |
| DE | 3905292 | A1 | | 8/1990 | |
| DE | 4011022 | A1 | | 10/1990 | |
| DE | 4011304 | C | | 8/1991 | |
| DE | 3832649 | C2 | | 11/1991 | |
| DE | 9111129 | U | | 1/1993 | |
| DE | 4206087 | C2 | | 1/1994 | |
| DE | 4322517 | A1 | | 2/1994 | |
| DE | 4300445 | A1 | | 7/1994 | |
| DE | 4338468 | C2 | | 1/1996 | |
| DE | 4433100 | A | | 4/1996 | |
| DE | 44 33 100 | | | 4/1996 | |
| DE | 19523543 | A1 | | 1/1997 | |
| DE | 19640146 | C1 | | 1/1998 | |
| DE | 4439360 | C2 | | 2/1998 | |
| DE | 19718744 | C1 | | 11/1998 | |
| EP | 0722051 | B1 | | 8/1999 | |
| FR | 2641232 | A1 | | 6/1990 | |
| FR | 26687374 | A1 | | 4/1992 | |
| GB | 1455069 | | | 11/1976 | |
| GB | 1464101 | | | 2/1977 | |
| GB | 2043186 | A | | 10/1980 | |
| GB | 2089741 | A | | 6/1982 | |
| GB | 2 122 146 | A | | 1/1984 | |
| GB | 2 122 146 | | | 1/1984 | |
| GB | 2220178 | A | | 1/1990 | |
| GB | 2227288 | A | | 7/1990 | |
| JP | 57104410 | | * | 6/1982 | 180/369 |
| JP | 4-46237 | | | 4/1992 | |
| JP | 6-109047 | A | | 4/1994 | |
| WO | WO 97/49591 | A1 | | 12/1997 | |

* cited by examiner

PLANETARY TRANSMISSION APPARATUS INCLUDING VEHICLE-WHEEL HUB

Matter enclosed in heavy brackets [ ] appears in the original patent but forms no part of this reissue specification; matter printed in italics indicates the additions made by reissue.

FIELD OF THE INVENTION

The present invention relates to a planetary transmission for a vehicle, comprising a planet carrier, on which at least one planet wheel is mounted, a hub arranged for a vehicle wheel and connected to the planet carrier, a static housing which is connected to the vehicle and in which the hub is mounted, and a friction brake arranged at an outer periphery of the planet carrier and intended to brake the rotation of the planet carrier in relation to the static housing.

BACKGROUND OF THE INVENTION

It is previously known to arrange a planetary transmission in conjunction with the wheel of a vehicle. The drive shaft of the vehicle is then provided with an inner sun wheel for the planetary transmission, and a static housing surrounding the planetary transmission is provided with an outer gear ring. The sun wheel and the gear ring interact with planet wheels which are arranged on a planet carrier. The planet carrier is connected to a hub which is mounted in the static housing, and a vehicle wheel can be mounted on the hub by means of wheel bolts. By arranging a planetary transmission in conjunction with the wheel of a vehicle, an increase in torque from the drive shaft to the wheel is obtained. In order to brake the vehicle, friction discs are arranged on the periphery of the planet carrier, which interact with disc plates which are arranged in the static housing.

The construction of the known planetary transmission is such that it is not suitable for large and heavy vehicles, such as industrial machinery, which would require, for example, a stronger hub bearing arrangement and thus a longer hub in the axial direction. This would, however, place greater demands on the connection between the planet carrier and the hub, at the same time as it is desirable to keep the planetary transmission as a whole as compact as possible.

SUMMARY OF THE INVENTION

The object of the present invention is to produce a planetary transmission of the type indicated in the introduction, which eliminates the problems indicated above and aims to obtain as compact a construction as possible.

A further object of the invention is to produce a planetary transmission which comprises relatively few components and is easy and inexpensive to manufacture.

According to the invention, this is achieved by virtue of the fact that the hub and the planet carrier are interconnected by means of a first splined connection.

According to the invention, this is also achieved by virtue of the fact that an outer gear ring is arranged so as to interact with the at least one planet wheel and that the outer gear ring is connected to the static housing by means of a second splined connection.

Such a planetary transmission is compact and comprises fewer components than the known planetary transmission in spite of the fact that the planetary transmission is dimensioned so as to absorb considerably greater forces than the known construction.

BRIEF DESCRIPTION OF THE DRAWINGS

The invention will be described in greater detail below with reference to the appended drawing which shows two exemplary embodiments and in which.

DESCRIPTION OF THE PREFERRED EMBODIMENT

Figure 1:
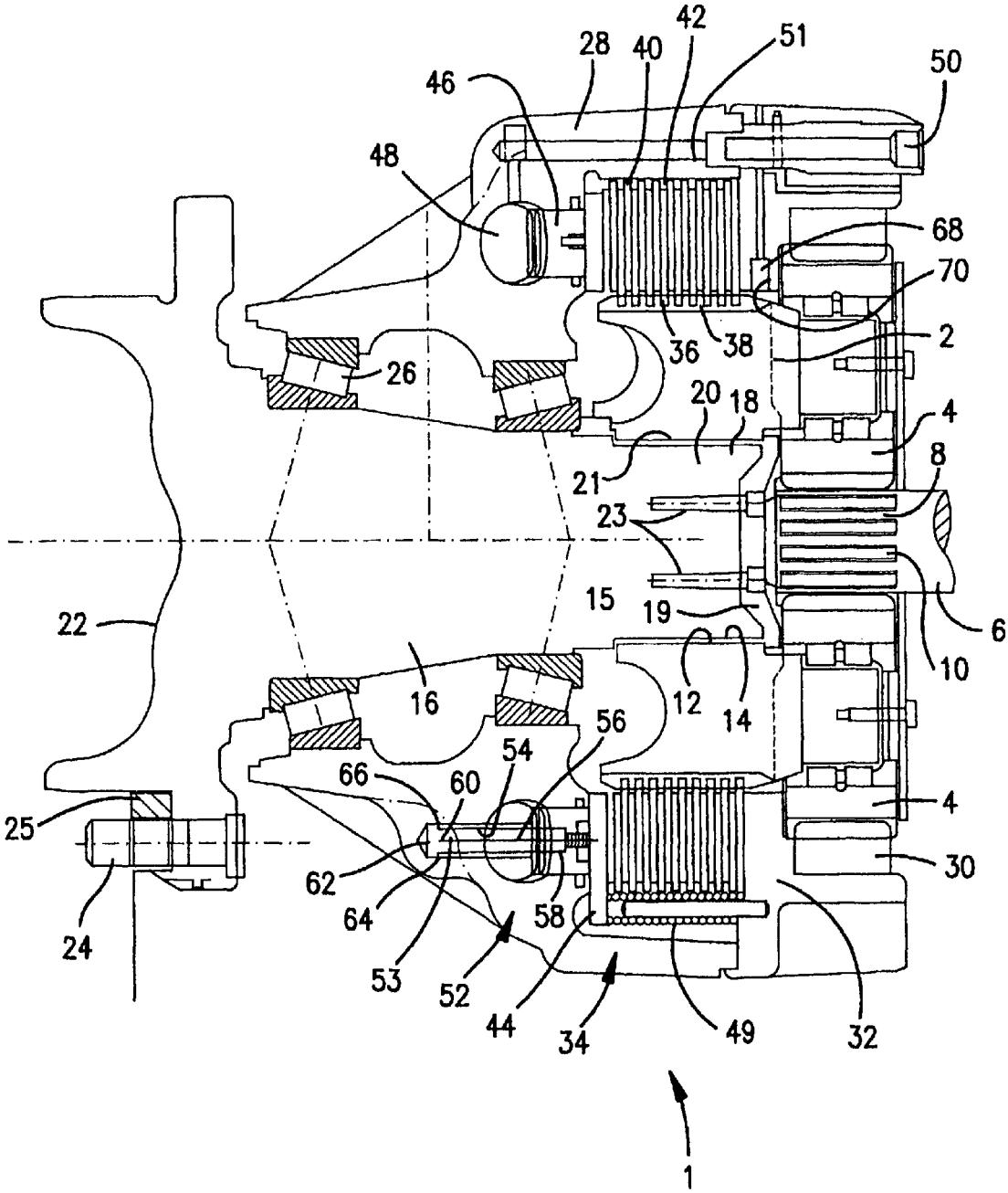
FIG. 1 shows a sectional side view of a planetary transmission according to a first exemplary embodiment of the present invention.

In FIG. 1, reference number 1 designates a planetary transmission for a vehicle, which planetary transmission 1 comprises a planet carrier 2, on which a number of planet wheels 4 are arranged. From the engine or gearbox (not shown) of the vehicle, a drive shaft 6 extends, the outer end 8 of which comprises an inner sun wheel 10 for the planetary transmission 1, which inner sun wheel 10 is intended to interact with the planet wheels 4 on the planet carrier 2. The number of planet wheels 4 according to the first exemplary embodiment in FIG. 1 is three, but it is also possible for the number of planet wheels 4 to be two, four or more.

The term vehicle is intended to mean both vehicles which are intended to be driven on the road and vehicles which are intended to be driven off-road, for example in the forest. Such vehicles may be dumpers, wheeled loaders, excavators or other industrial machinery.

The planet carrier 2 comprises a through-hole 12 which is provided with splines 14. The centre line 15 of the hole 12 coincides with the axis of rotation of the planet carrier 2. A tub 16, which at a first end 18 comprises a journal 20 with splines 21, is arranged in the hole 12 of the planet carrier 2 and is thus radially connected to the planet carrier 2. A plate 19 is connected to the hub 16 by means of screws 23 and ensures that the hub 16 is axially connected to the planet carrier 2. The hub 16 comprises at a second end 22 a fastening arrangement 24 for a wheel 25 for the vehicle.

The hub 16 is mounted by means of roller bearings 26 mi a static housing 28 which is connected to the vehicle. The hub 16 therefore rotates in relation to the housing 28. Arranged in the housing 28 is an outer gear ring 30 for the planetary transmission 1, which ring is intended to interact with the planet wheels 4 on the planet carrier 2. The gear ring 30 is connected to a first pressure plate 32 for a friction brake 34 which will be described below.

The friction brake 34 comprises a set of friction discs 36 which are arranged on the periphery of the planet carrier 2. According to the first exemplary embodiment shown, the number of friction discs 36 is eight, but an arbitrary number of friction discs 36 is possible. The friction discs 36 are axially displaceable on splines 38 which are arranged on the periphery of the planet carrier 2. The friction discs 36 are locked on the planet carrier 2 in the circumferential direction.

A set of disc plates 40 is arranged on splines 42 in the housing 28. The disc plates 40 are axially displaceable but locked in the circumferential direction relative to the housing 28. The number of disc plates 40 is preferably the same as the number of friction discs 36. Alternatively, the disc plates 40 may be arranged on the periphery of the planet career 2 and the friction discs 36 may be arranged in the housing 28. The disc plates may be made of for example metal, plastic or carbon fibre. It is also possible to use other materials.

A second pressure plate 44 is arranged so as to compress the friction discs 36 and the disc plates 40 against the first pressure plate 32 when the rotation of the planet carrier 2 and thus the movement of the vehicle are to be braked. The second pressure plate 44 can be displaced axially by a number of hydraulic pistons 46 which are distributed along the second pressure plate 44. The hydraulic pistons 46 displace the second pressure plate 44 axially by means of hydraulic fluid under pressure acting on the hydraulic pistons 46. The hydraulic fluid is contained in an annular duct 48 arranged in the housing 28. The hydraulic fluid is supplied to the annular duct 48 through a mouthpiece 50 and a bore 51 in the housing 28. One or more helical springs 49, which are arranged between the first and second pressure plates 32 and 44 respectively, return the hydraulic piston 46 to an initial position after braking.

The first and second pressure plates 32 and 44 respectively and also the fiction discs 36 and the disc plates 40 are preferably annular but they may also be arranged in segments in a circular shape around the centre line 15 of the planet carrier 2.

According the first exemplary embodiment in FIG. 1, the hydraulic pistons 46 may alternatively be provided with a self-adjustment member 52 which adjusts the initial position of the hydraulic piston 46 as the fiction discs 36 wear. The self-adjustment member 52 comprises a sleeve 53 which is arranged with a grip fit in a blind hole 54 in the housing 28. A pin 56, which extends through the sleeve 53, is at a first end 58 connected to the hydraulic piston 46 and is at a second end 60 provided with a head 62 which has a bearing surface 64 intended to bear against an end surface 66 of the sleeve 53. As the friction discs 36 wear, the hydraulic piston 46 must travel a greater distance in order to compress the friction discs 36 and the disc plates 40 against the first pressure plate 32 and thus a greater volume of hydraulic fluid is required. In order to overcome this problem, the grip between the sleeve 53 and the blind hole 54 is adapted in such a manner that the force from the hydraulic fluid that acts on the hydraulic piston 46 causes the sleeve 53, with the aid of the head 62 of the pin 56, to be displaced in the blind hole 54 and to occupy a new position. The grip between the sleeve 53 and the blend hole 54 is, however, adapted in such a manner that the force from the helical spring 49 does not cause the sleeve 53 to be displaced in the blind hole 54, which means that the hydraulic piston 46 will occupy a new initial position after the return stroke.

As an alternative, a sensor 68 may also be arranged in the housing 18, which senses the speed of rotation of the planet carrier 2 and thus also the speed of the vehicle. The sensor 68 is suitably arranged in a hole 70 in the housing 28 at the first pressure plate 32 and is directed towards the splines 38 on the periphery of the planet carrier 2, on which splines the first friction discs 36 are arranged The sensor 68 then senses how fast the bars of the splines 38 pass the sensor 68, which is proportional to the speed of rotation of the planet carrier 2. In order to increase the accuracy of the sensing of the sensor 68, the planet carrier 2 may alternatively be provided with teeth or splines with a finer pitch next to the splines 38 on which the first friction discs 36 are arranged.

Figure 2:
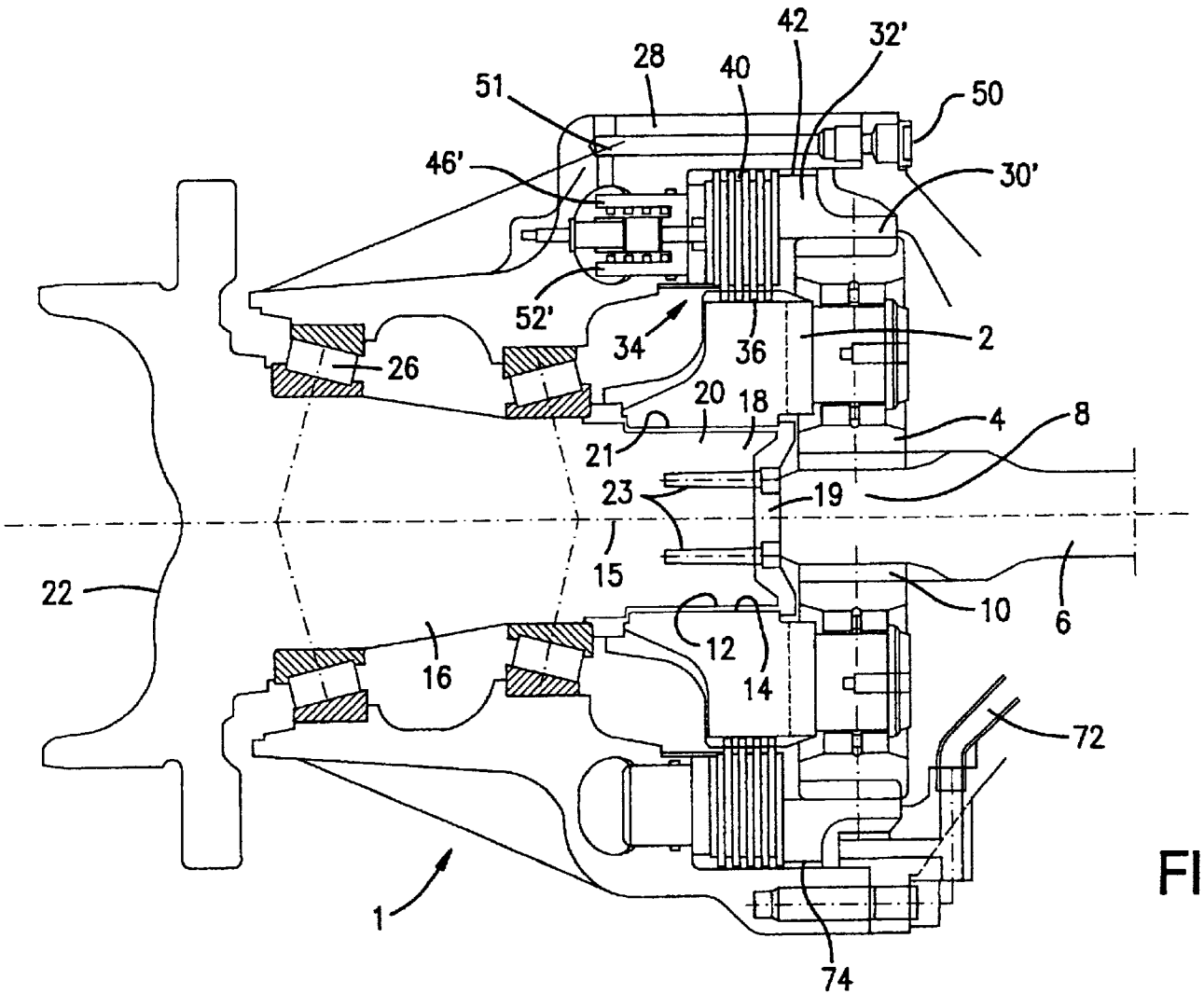
FIG. 2 shows a sectional side view of a planetary transmission according to a second exemplary embodiment of the present invention.

In FIG. 2, a second exemplary embodiment according to the invention is shown. The planetary transmission according to this second exemplary embodiment comprises an outer gear ring 30' which is arranged so as to engage with the splines 42 which are formed in the housing 28. The height of the splines 42 has, in a portion that interacts with the gear ring 30', been reduced so as to form a stop or a beating surface for the gear ring 30'. The outer gear ring 30' is on an outer periphery, provided with splines 74 which engage with the splines 42 in the housing 28 to form a second splined connection.

The gear ring 30' forms a first pressure plate 32' for the friction discs 36 and the disc plates 40 which form the friction brake 34. The friction brake 34 preferably operates in a fluid which is made to circulate through a cooling device (not shown) by means of a pipe 72.

In FIG. 2, a self-adjustment member 52' is shown, which adjusts the initial position of the hydraulic piston 46' as the friction discs 36 wear. Apart from the features described above in connection with FIG. 2, the construction of other components of the planetary transmission according to FIG. 2 essentially corresponds to the connection of the components described in connection with the planetary transmission according to FIG. 1.

What is claimed is:

[1. Planetary transmission apparatus for use in a vehicle, comprising a planet carrier (2), on which at least one planet wheel (4) is mounted, a vehicle-wheel hub (16) connected to the planet carrier (2), a static housing (28) which is adapted to be connected to the vehicle and in which the hub (16) is mounted, and a friction brake (34) arranged on an outer periphery of the planet carrier (2) and acting directly between the planet carrier (2) and the static housing (28), wherein the hub (16) and the planet carrier (2) are interconnected by means of a first splined connection (14, 21).]

[2. Planetary transmission apparatus according to claim 1, characterized in that the planet carrier (2) comprises a splined hole (12), the centre line (15) of which coincides with the axis of rotation of the planet carrier (2) and in that the hub (16) comprises a splined journal (20) which is arranged in the hole (12) of the planet carrier (2).]

[3. Planetary transmission apparatus according to claim 2, characterized in that the splined journal (20) of the hub (16) is axially fixed in the splined hole (12) of the planet carrier (2) by means of a plate (19) arranged at a first end (18) of the hub (16).]

[4. Planetary transmission apparatus according to claim 1, characterized in that the friction brake (34) comprises a set of first friction discs (36) arranged on the periphery of the planet carrier (2) and a set of second friction discs (40) arranged on an inner side of the static housing (28).]

[5. Planetary transmission apparatus according to claim 4, characterized in that the first and second friction discs (36 and 40 respectively) are axially displaceable on the planet carrier (29) and the static housing (28) respectively.]

[6. Planetary transmission apparatus according to claim 5, characterized in that a first pressure plate (32, 32') for the friction brake (34) is arranged on the static housing (28) and in that a second pressure plate (44) is arranged so as to be displaced, on braking, in the direction of the first pressure plate (32) so as to compress the first and second friction discs (36 and 40 respectively) between the first and second pressure plates (32, 44).]

[7. Planetary transmission apparatus according to claim 6, characterized in that at least one hydraulic piston (46, 46) is arranged in the static housing (28) and is arranged so as to displace, on braking, the second pressure plate (44) in the direction of the first pressure plate (32).]

[8. Planetary transmission apparatus according to claim 7, characterized in that an annular duct (48) is arranged in the static housing (28) and is intended to contain hydraulic fluid and in that the annular duct (48) has a fluid connection to the at least one hydraulic cylinder (46, 46').]

[9. Planetary transmission apparatus according to claim 7, characterized in that the at least one hydraulic cylinder (46 46') comprises a self-adjustment member (52) which, via a sleeve (53), is arranged displaceably in a hole (54) in the housing (28), a pin (56) movable axially in the sleeve (53) being connected to the hydraulic piston (46, 46').]

[10. Planetary transmission apparatus according to claim 1, characterized in that an outer gear ring (30, 30') is arranged on the static housing (28) and in that an inner sun wheel (10) is arranged on a drive shaft (6) of the vehicle.]

[11. Planetary transmission apparatus according to claim 6, characterized in that an outer gear ring (30, 30') is arranged on the first pressure plate (32, 32').]

[12. Planetary transmission apparatus according to claim 10, characterized in that the outer gear ring (30') is connected to the static housing (28) by means of a second splined connection (42, 74).]

[13. Planetary transmission apparatus according to claim 1, characterized in that a sensor (68) arranged in the housing (18) is adapted to interact with a surface on the periphery of the planet carrier (2) so as in this way to sense the speed of rotation of the planet carrier (2).]

[14. Planetary transmission apparatus for use in a vehicle, comprising a planet carrier (2), on which at least one planet wheel (4) is mounted, a vehicle-wheel hub (16) connected to the planet carrier (2), a static housing (28) which is adapted to be connected to the vehicle and in which the hub (16) is mounted, and a friction brake (34) arranged on an outer periphery of the planet carrier (2) and acting directly between the planet carrier (2) and the static housing (28), wherein an outer gear ring (30') is arranged so as to interact with the at least one planet wheel (4) and in that the outer gear ring (30') is connected to the static housing (28) by means of a second splined connection (42, 74).]

[15. Planetary transmission apparatus according to claim 14, characterized in that splines (74) on an outer periphery of the outer gear ring (30') and in that splines (42) are arranged in the housing (28), which splines (42, 74) form the second splined connection (42, 74).]

[16. Planetary transmission apparatus according to claim 14, characterized in that the friction brake (34) comprises a set of first friction discs (36) arranged on the periphery of the planet carrier (2) and a set of second friction discs (40) arranged on an inner side of the static housing (28), which second friction discs (40) are arranged so as to engage with the splines (42) in the housing (28).]

[17. Planetary transmission apparatus according to claim 16, characterized in that the outer gear ring (30') forms a first pressure plate (32') which is arranged so as to compress, on braking, the first and second friction discs (36, 40).]

*18. Planetary transmission apparatus for use in a vehicle, comprising:*

*a planet carrier (2), on which at least one planet wheel (4) is mounted, a vehicle-wheel hub (16) connected to the planet carrier (2), a static housing (28) which is adapted to be connected to the vehicle and in which the hub (16) is mounted, and*

*a hydraulically activated friction brake (34) arranged on an outer periphery of the planet carrier (2) and acting directly between the planet carrier (2) and the static housing (28), and*

*wherein the hub (16) and the planet carrier (2) are interconnected by means of a first splined connection (14, 21) and the planet carrier (2) being of one-piece construction and wherein the planet carrier (2) extends solidly in a radial direction between a centered hole (12) thereof and the outer periphery of the planet carrier (2) upon which the multi-disc brake (34) is arranged.*

*19. The planetary transmission according to claim 18, wherein the centered hole (12) of the planet carrier (2) is a longitudinal through-hole.*

*20. The planetary transmission according to claim 19, wherein splines (14) are provided at an interior surface of the longitudinal through-hole (12).*

*21. The planetary transmission apparatus according to claim 18, wherein the centered hole (12) forms a portion of the first splined connection (14, 21).*

*22. A planetary transmission apparatus for use in a vehicle, comprising:*

*a planet carrier (2), on which at least one planet wheel (4) is mounted, a vehicle-wheel hub (16) connected to the planet carrier (2), a static housing (28) which is adapted to be connected to the vehicle and in which the hub (16) is mounted;*

*a friction brake (34) arranged on an outer periphery of the planet carrier (2) and acting directly between the planet carrier (2) and the static housing (28);*

*the hub (16) and the planet carrier (2) are interconnected by means of a first splined connection (14, 21) and the hub (16) being of one-piece construction with a splined journal (20) that forms a portion of the first splined connection (14, 21) and wherein the planet carrier (2) extends solidly in a radial direction between a centered hole (12) thereof and the outer periphery of the planet carrier (2) upon which the multi-disc brake (34) is arranged, wherein the centered hole (12) of the planet carrier (2) is a longitudinal through-hole, and wherein splines (14) are provided at an interior surface of the longitudinal through-hole (12).*

*23. The planetary transmission apparatus according to any one of claims 18 and 22, wherein the friction brake (34) comprises a set of first friction discs (36) arranged on the periphery of the planet carrier (2) and a set of second friction discs (40) arranged on an inner side of the static housing (28).*

*24. The planetary transmission apparatus according to claim 23, wherein the first and second friction discs (36 and 40 respectively) are axially displaceable on the planet carrier (29) and the static housing (28) respectively.*

*25. The planetary transmission apparatus according to claim 24, wherein a first pressure plate (32, 32') for the friction brake (34) is arranged on the static housing (28) and in that a second pressure plate (44) is arranged so as to be displaced, on braking, in the direction of the first pressure plate (32) so as to compress the first and second friction discs (36 and 40 respectively) between the first and second pressure plates (32, 44).*

*26. The planetary transmission apparatus according to claim 25, wherein an outer gear ring (30, 30') is arranged on the first pressure plate (32, 32').*

*27. The planetary transmission apparatus according to claim 25, wherein at least one hydraulic piston (46, 46') is arranged in the static housing (28) and is arranged so as to displace, on braking, the second pressure plate (44) in the direction of the first pressure plate (32).*

*28. The planetary transmission apparatus according to claim 27, wherein an annular duct (48) is arranged in the static housing (28) and is intended to contain hydraulic fluid and in that the annular duct (48) has a fluid connection to the at least one hydraulic piston (46, 46').*

*29. The planetary transmission apparatus according to claim 27, wherein the at least one hydraulic piston (46, 46') comprises a self-adjustment member (52) which, via a sleeve (53), is arranged displaceably in a hole (54) in the housing (28), a pin (56) movable axially in the sleeve (53) being connected to the hydraulic piston (46, 46').*

*30. The planetary transmission apparatus according to any one of claims 18 and 22, further comprising an outer gear ring (30, 30') arranged on the static housing (28) and an inner sun wheel (10) arranged on a drive shaft (6) of the vehicle.*

*31. The planetary transmission apparatus according to claim 29, wherein the outer gear ring (30, 30') is connected to the static housing (28) by means of a second splined connection (42, 74).*

*32. The planetary transmission apparatus according to any one of claims 18 and 22, further comprising a sensor (68) arranged in the housing (28) that is adapted to interact with a surface on the periphery of the planet carrier (2) so as in this way to sense the speed of rotation of the planet carrier (2).*

*33. The planetary transmission apparatus according to any one of claims 18 and 22, further comprising an outer gear ring (30′) arranged so as to interact with the at least one planet wheel (4) and in that the outer gear ring (30′) is connected to the static housing (28) by means of a second splined connection (42, 74).*

*34. The planetary transmission apparatus according to claim 33, further comprising splines (74) on an outer periphery of the outer gear ring (30′) and splines (42) arranged in the housing (28), said splines (42, 74) forming the second splined connection (42, 74).*

*35. The planetary transmission apparatus according to claim 33, wherein the friction brake (34) comprises a set of first friction discs (36) arranged on the periphery of the planet carrier (2) and a set of second friction discs (40) arranged on an inner side of the static housing (28), which second friction discs (40) are arranged so as to engage with the splines (42) in the housing (28).*

*36. The planetary transmission apparatus according to claim 33, wherein the outer gear ring (30′) forms a first pressure plate (32′) which is arranged so as to compress, on braking, the first and second friction discs (36, 40).*

*37. The planetary transmission apparatus according to any one of claims 18 and 22, further comprising a plurality of individual pistons that actuate the friction brake (34) and which are distributed concentrically about the planet carrier within the static housing (28).*

*38. The planetary transmission apparatus according to any one of claims 18 and 22, wherein said friction brake (34) consists of a fluid-cooled multi-disc friction brake configured to brake the planet carrier and which has a first set of brake discs mounted on the outer periphery of the planet carrier for rotation therewith and a second set of brake discs mounted to the static housing (28).*

*39. The planetary transmission apparatus according to claim 38, further comprising a concentrically oriented disc plate configured to actuate the fluid-cooled multi-disc brake responsively to applied hydraulic pressure.*

*40. The planetary transmission according to claim 39, further comprising a plurality of concentrically distributed hydraulic pistons configured to actuate the disc plate thereby compressing the brake discs sets together for braking the planet carrier.*

*41. The planetary transmission according to claim 40, further comprising an annular duct in fluid communication with each of the plurality of concentrically distributed hydraulic pistons which is arranged to commonly supply actuating hydraulic fluid to each of the hydraulic pistons.*

*42. The planetary transmission according to claim 38, further comprising a helical spring operatively arranged with the fluid-cooled multi-disc brake and configured to return the brake to an initial position after braking.*

*43. The planetary transmission according to claim 38, further comprising a plurality of concentrically distributed helical springs operatively arranged with the fluid-cooled multi-disc brake and configured to return the brake to an initial position after braking.*

*44. The planetary transmission according to claim 38, further comprising a self-adjustment member operatively arranged with the fluid-cooled multi-disc brake and configured to adjust initial braking positions of the brake responsive to friction-wear of the brake discs.*

*45. The planetary transmission according to claim 38, wherein each set of brake discs is axially movable and circumferentially fixed on splines.*

*46. The planetary transmission according to claim 38, wherein the first set of brake discs is axially movable and circumferentially fixed on splines peripherally formed on the planet carrier.*

*47. The planetary transmission according to claim 38, wherein the second set of brake discs is axially movable and circumferentially fixed on splines formed at the static transmission housing.*

*48. The planetary transmission according to claim 38, wherein the outer gear ring forms a pressure plate of the brake.*

*49. The planetary transmission according to claim 38, wherein the outer gear ring establishes a static pressure plate against which the sets of brake discs are compressed during braking of the planet carrier.*

*50. The planetary transmission according to claim 38, wherein the outer gear ring is rotationally fixed upon internal splines of the static transmission housing.*

*51. The planetary transmission according to claim 50, wherein the outer gear ring has splines arranged on an outer periphery thereof and which are configured for mating engagement with the internal splines of the transmission housing.*

*52. The planetary transmission according to claim 38, further comprising a sensor arranged in the transmission housing for detecting an operational condition of the planetary transmission.*

*53. The planetary transmission according to claim 38, further comprising a sensor arranged in the transmission housing that detects an operational condition of the planetary transmission that corresponds to a traveling speed of a vehicle in which the transmission is included.*

*54. The planetary transmission according to claim 38, wherein the planet carrier extends solidly in a radial direction between a centered hole thereof and the outer periphery of the planet carrier upon which the multi-disc brake is arranged.*

*55. The planetary transmission according to claim 54, wherein the centered hole of the planet carrier is a longitudinal through-hole.*

*56. The planetary transmission according to claim 55, wherein splines are provided at an interior surface of the longitudinal through-hole.*

*57. The planetary transmission according to claim 38, wherein the multi-disc brake is a hydraulically activated friction brake acting directly between the planet carrier and the static transmission housing.*

*58. The planetary transmission according to claim 38, wherein the hub is mounted by roller bearings on an inside of the static housing.*

*59. The planetary transmission according to claim 38, wherein the hub is mounted by two roller bearings arranged at a distance, one from the other, in a direction of an axis of rotation of the planet carrier and an outer portion of each roller bearing is arranged on an inside of the static housing.*

*60. The planetary transmission according to claim 59, wherein an inner portion of one of the two roller bearings is arranged on an outside of the hub.*

*61. The planetary transmission according to claim 59, wherein an inner portion of each of the two roller bearings is arranged on an outside of the hub.*

* * * * *